(12) United States Patent
Kim et al.

(10) Patent No.: US 10,207,913 B2
(45) Date of Patent: Feb. 19, 2019

(54) FUEL-UREA INJECTION APPARATUS INCLUDING COMMON INLET FOR VEHICLE

(71) Applicant: Hyundai Motor Company, Seoul (KR)

(72) Inventors: Seok Lae Kim, Guri-si (KR); Ki Wung Kim, Goyang-si (KR); Jung Su Park, Seoul (KR); Chang Han Kim, Gwangju (KR)

(73) Assignee: Hyundai Motor Company, Seoul (KR)

( * ) Notice: Subject to any disclaimer, the term of this patent is extended or adjusted under 35 U.S.C. 154(b) by 77 days.

(21) Appl. No.: 15/346,623

(22) Filed: Nov. 8, 2016

(65) Prior Publication Data

US 2017/0355589 A1    Dec. 14, 2017

(30) Foreign Application Priority Data

Jun. 9, 2016   (KR) .......................... 10-2016-0071468

(51) Int. Cl.
*B60K 15/04* (2006.01)
*B67D 7/32* (2010.01)
(Continued)

(52) U.S. Cl.
CPC ............ *B67D 7/3245* (2013.01); *B60K 15/04* (2013.01); *B67D 7/02* (2013.01); *B67D 7/0294* (2013.01);
(Continued)

(58) Field of Classification Search
CPC ... B67D 7/3245; B67D 7/0294; F01N 3/2896; F01N 2610/1413; F01N 2610/02;
(Continued)

(56) References Cited

U.S. PATENT DOCUMENTS 4,596,277 A * 6/1986 Djordjevic ............. F02M 27/02
                                                            123/1 A
5,385,178 A * 1/1995 Bedi ....................... B60K 15/04
                                                            141/302

(Continued)

FOREIGN PATENT DOCUMENTS

JP        2008-254816 A      10/2008
JP        2009-62841 A       3/2009
(Continued)

*Primary Examiner* — Nicolas A Arnett
(74) *Attorney, Agent, or Firm* — Morgan, Lewis & Bockius LLP (57) ABSTRACT

A fuel-urea injection apparatus including a common inlet for a vehicle may include a filler neck including the common inlet, into which a fuel injection nozzle and a urea injection nozzle, are inserted, a detector detecting whether the injection nozzle inserted into the filler neck is the fuel injection nozzle or the urea injection nozzle, a switchover valve mounted at a common injection pipe connected to the filler neck, a urea injection pipe connected between a urea outlet of the switchover valve and a urea tank, a fuel injection pipe connected between a fuel outlet of the switchover valve and a fuel tank, and a controller controlling an operation of the switchover valve in accordance with the injection nozzle detected by the detector as being inserted into the filler neck to supply either fuel or urea to the corresponding outlet of the fuel and urea outlets.

5 Claims, 5 Drawing Sheets (51) Int. Cl.
*B67D 7/02* (2010.01)
*B67D 7/34* (2010.01)
*B67D 7/42* (2010.01)

(52) U.S. Cl.
CPC .............. *B67D 7/344* (2013.01); *B67D 7/42* (2013.01); *B60K 2015/049* (2013.01); *F01N 2610/02* (2013.01); *F01N 2610/142* (2013.01); *F01N 2610/1413* (2013.01)

(58) Field of Classification Search
CPC .............. F01N 2610/142; B60K 15/04; B60K 2015/049; B60K 2015/046
See application file for complete search history.

(56) References Cited

U.S. PATENT DOCUMENTS

| | | | | |
|---|---|---|---|---|
| 5,971,017 | A * | 10/1999 | Kinoshita | B60K 15/03 123/516 |
| 6,216,755 | B1 * | 4/2001 | Neufert | B60K 15/03 137/256 |
| 6,263,924 | B1 * | 7/2001 | Grosser | B60K 15/00 141/102 |
| 6,374,868 | B1 * | 4/2002 | Channing | B60K 15/04 141/100 |
| 6,390,147 | B1 * | 5/2002 | Channing | B60K 15/04 141/100 |
| 6,527,021 | B2 * | 3/2003 | Channing | B60K 15/04 141/100 |
| 6,554,031 | B2 * | 4/2003 | Channing | B60K 15/04 141/100 |
| 6,568,436 | B1 * | 5/2003 | Matthews | F01M 11/04 141/192 |
| 6,681,811 | B2 * | 1/2004 | Channing | B60K 15/04 141/100 |
| 7,165,583 | B1 * | 1/2007 | Walkowski | B60K 15/0406 141/350 |
| 7,578,321 | B2 * | 8/2009 | Levin | F01N 3/2066 141/55 |
| 7,644,740 | B2 * | 1/2010 | Benjey | B60K 15/0406 141/348 |
| 7,866,357 | B2 * | 1/2011 | Compere | B60K 15/03 123/1 A |
| 7,958,912 | B2 * | 6/2011 | Levin | F01N 3/2066 141/50 |
| 8,167,009 | B2 * | 5/2012 | Vandervoort | B60K 15/0406 123/1 A |
| 8,186,394 | B2 * | 5/2012 | Nourdine | B60K 15/04 141/348 |
| 8,371,344 | B2 * | 2/2013 | Vandervoort | B60K 15/0406 123/1 A |
| 8,678,049 | B2 * | 3/2014 | Roys | B67D 7/344 141/1 |
| 8,919,393 | B2 * | 12/2014 | Budzyk | B60K 15/04 141/290 |
| 9,359,184 | B2 * | 6/2016 | Post | B67D 7/3245 |
| 9,469,520 | B2 * | 10/2016 | Schulze | B67D 7/344 |
| 9,604,158 | B2 * | 3/2017 | Ham | B01D 19/0073 |
| 2002/0170616 | A1 * | 11/2002 | Channing | B60K 15/04 141/9 |
| 2002/0170621 | A1 * | 11/2002 | Channing | B60K 15/04 141/286 |
| 2003/0150507 | A1 * | 8/2003 | Channing | B60K 15/04 141/9 |
| 2008/0210333 | A1 * | 9/2008 | Benjey | B60K 15/0406 141/59 |
| 2010/0224284 | A1 * | 9/2010 | Kolberg | F01N 3/2066 141/325 |
| 2012/0199246 | A1 * | 8/2012 | Budzyk | B60K 15/04 141/383 |
| 2012/0305127 | A1 * | 12/2012 | Roys | B67D 7/344 141/1 |
| 2013/0192714 | A1 * | 8/2013 | Wagner | B60K 15/04 141/98 |
| 2013/0248048 | A1 * | 9/2013 | Behnamrad | B60K 15/04 141/311 R |
| 2014/0202593 | A1 * | 7/2014 | Douteau-Poiroux | B60K 13/04 141/311 R |
| 2014/0326748 | A1 * | 11/2014 | Post | B67D 7/3245 222/55 |
| 2014/0367390 | A1 | 12/2014 | Horlacher | |
| 2015/0251893 | A1 * | 9/2015 | Jonasson | B67D 7/46 141/1 |
| 2016/0003122 | A1 * | 1/2016 | Ham | B67D 7/0294 60/295 |

FOREIGN PATENT DOCUMENTS

| | | |
|---|---|---|
| JP | 2014-118004 A | 6/2014 |
| KR | 10-2006-0058244 A | 5/2006 |
| KR | 10-2007-0060917 A | 6/2007 |

* cited by examiner

< Perspective View >    < Cut-away Perspective View >

FUEL-UREA INJECTION APPARATUS INCLUDING COMMON INLET FOR VEHICLE

CROSS-REFERENCE TO RELATED APPLICATION

The present application claims priority to Korean Patent Application No. 10-2016-0071468, filed Jun. 9, 2016, the entire contents of which is incorporated herein for all purposes by this reference.

BACKGROUND OF THE INVENTION

Field of the Invention

The present invention relates to a fuel-urea injection apparatus of a vehicle, and more particularly, to a fuel-urea injection apparatus including a common inlet for a vehicle capable of improving aesthetics of the vehicle as integration of a fuel inlet and a urea inlet which causes a fuel filler door not to be oversized, and fundamentally prevents mis-fuelling of diesel fuel and urea.

Description of Related Art

As environmental pollution has emerged as an important social issue, regulation on emissions of an internal combustion engine using fossil fuel have been gradually tightened.

Particularly, since emissions from diesel vehicles using diesel fuel, such as a bus or a truck, contain a great quantity of nitrogen oxide ($NO_x$), emission regulations impose strict controls on nitrogen oxide emission.

To meet such emission regulations, a method of decreasing nitrogen oxide included in emissions of a diesel engine using a selective catalytic reduction (SCR) system is provided.

The SCR system may effectively decrease nitrogen oxide of emissions by supplying a reducer to an SCR catalyst. For example, the reducer, such as ammonia, is supplied to emissions to reduce nitrogen oxide to nitrogen and water.

Namely, in a diesel vehicle including the SCR catalyst, urea is injected into an exhaust pipe using an injector. When the injected urea is decomposed into ammonia by heat of emissions, the SCR catalyst catalyzes reaction between decomposed ammonia and nitrogen oxide in emissions, and then nitrogen oxide is removed by a reduction process, in which nitrogen oxide is decomposed into nitrogen ($N_2$) and water ($H_2O$).

Such an SCR system is mainly applied to full-size vehicles, such as trucks, but recently, an application range thereof is extended to small-size and mid-size vehicles.

Meanwhile, in vehicles including the SCR system, since urea is continuously used to remove nitrogen oxide while driving, urea should be recharged as fuel (diesel) is refueled to the vehicles.

Accordingly, a diesel vehicle including the SCR system includes a urea tank for restoring urea, and a filler neck for injecting urea to the urea tank. Urea is injected through the filler neck using an injection nozzle in a gas station, and then the urea tank is filled with urea.

Accordingly, the diesel vehicle including the SCR system separately includes a urea inlet besides a fuel (diesel) inlet in a fuel filler door. A filler neck for urea and an inlet pipe for urea are further provided apart from a filler neck for fuel and an inlet pipe for fuel.

Figure 1:
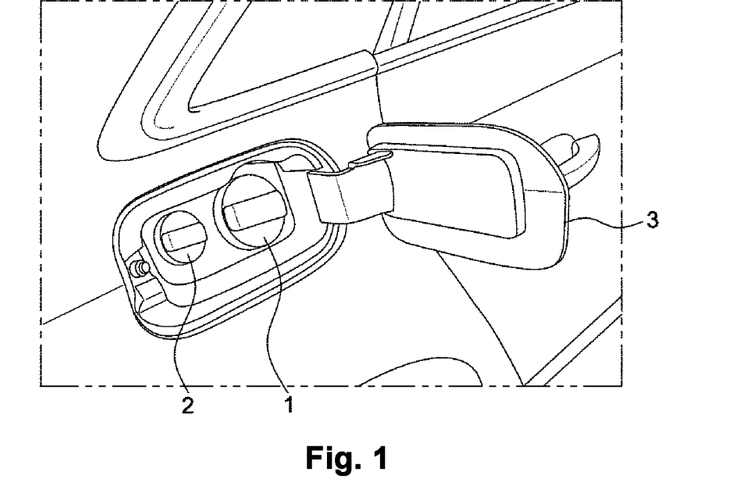
FIG. 1 is a view illustrating a conventional fuel filler door.

As illustrated in FIG. 1, when the urea inlet is separately provided besides the fuel inlet, a size of a fuel filler door 3 covering a fuel cap 1 for closing the fuel inlet and a urea cap 2 for closing the urea inlet may be increased. This detracts from aesthetics of the vehicle in terms of design.

Figure 2:
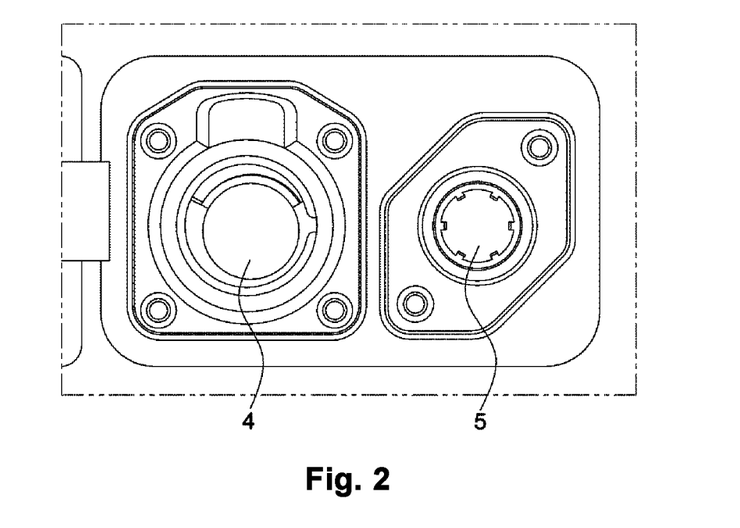
FIG. 2 is a view illustrating sizes of a conventional fuel inlet and a conventional urea inlet.

Furthermore, as illustrated in FIG. 2, although there is an inner diameter difference between the fuel inlet 4 and the urea inlet 5, for example, the inner diameter of the urea inlet 5 is smaller than that of the fuel inlet 4, a urea injection nozzle is capable of being inserted into the fuel inlet 4. In this case, urea may be mis-fuelled to a fuel tank through the fuel inlet 4.

When urea is mis-fuelled into the fuel inlet 4 instead of diesel fuel, starting a car or driving may not be performed, and the fuel tank, a fuel line, a fuel filter, and so on may need to be repaired.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a fuel-urea injection apparatus including a common inlet for a vehicle capable of improving aesthetics of the vehicle as integration of a fuel inlet and a urea inlet causes a fuel filler door not to be oversized, and fundamentally preventing mis-fuelling of diesel fuel and urea.

According to various aspects of the present invention, a fuel-urea injection apparatus including a common inlet for a vehicle may include a filler neck comprising the common inlet, into which a fuel injection nozzle and a urea injection nozzle, are inserted, a detector detecting whether the injection nozzle inserted into the filler neck is the fuel injection nozzle or the urea injection nozzle, a switchover valve mounted at a common injection pipe connected to the filler neck, a urea injection pipe connected between a urea outlet of the switchover valve and a urea tank, a fuel injection pipe connected between a fuel outlet of the switchover valve and a fuel tank, and a controller controlling an operation of the switchover valve to either the fuel outlet or the urea outlet in accordance with the injection nozzle detected by the detector as being inserted into the filler neck in order to supply either fuel or urea injected through the common injection pipe to the corresponding outlet of the fuel and urea outlets.

The detector may include a magnet mounted at a predetermined one of the fuel and urea injection nozzles, and a coil mounted at a path, through which the injection nozzle inserted through the common inlet passes, in the filler neck, the coil generating an induced current through the magnet when the injection nozzle including the magnet passes through the path.

The magnet may be mounted at the urea injection nozzle.

The coil may be mounted at a retainer for guiding the injection nozzle inserted into the filler neck through the common inlet, and the retainer may be mounted in a filler housing of the filler neck.

The coil may be wound along a spiral-shaped inner diameter surface of the cylindrically shaped retainer.

The coil may be inserted into a spiral-shaped coil groove formed at the inner diameter surface of the cylindrically shaped retainer, and the coil may be mounted along the spiral-shaped coil groove.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 3:
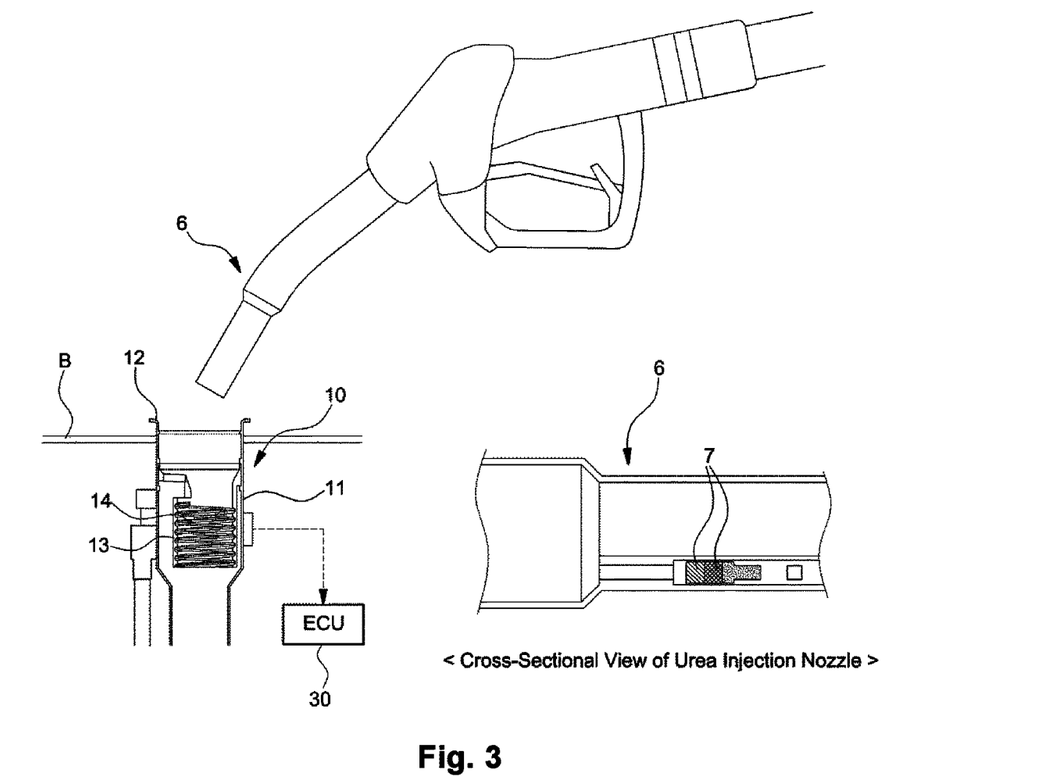
FIG. 3 is a view illustrating a filler neck and a magnet of a urea injection nozzle in a fuel-urea injection apparatus according to various embodiments of the present invention.

FIG. 3 is a view illustrating a filler neck and a magnet of a urea injection nozzle in a fuel-urea injection apparatus according to various embodiments of the present invention.

Figure 4:
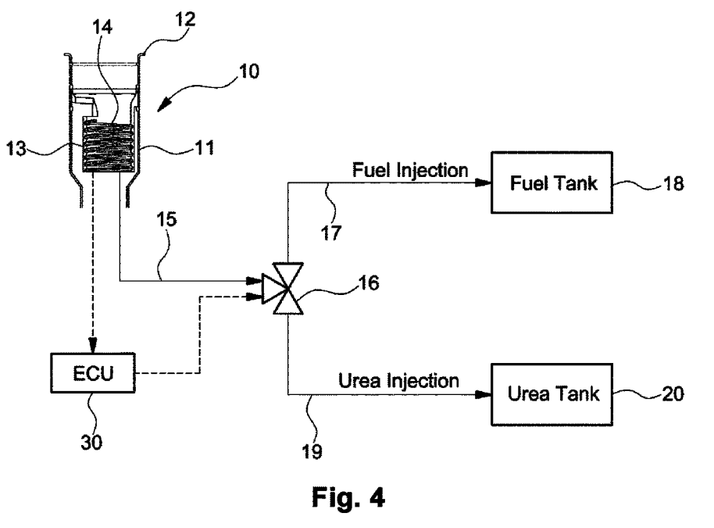
FIG. 4 is a schematic view illustrating the fuel-urea injection apparatus according to various embodiments of the present invention.

FIG. 4 is a schematic view illustrating the fuel-urea injection apparatus according to various embodiments of the present invention.

Figure 5:
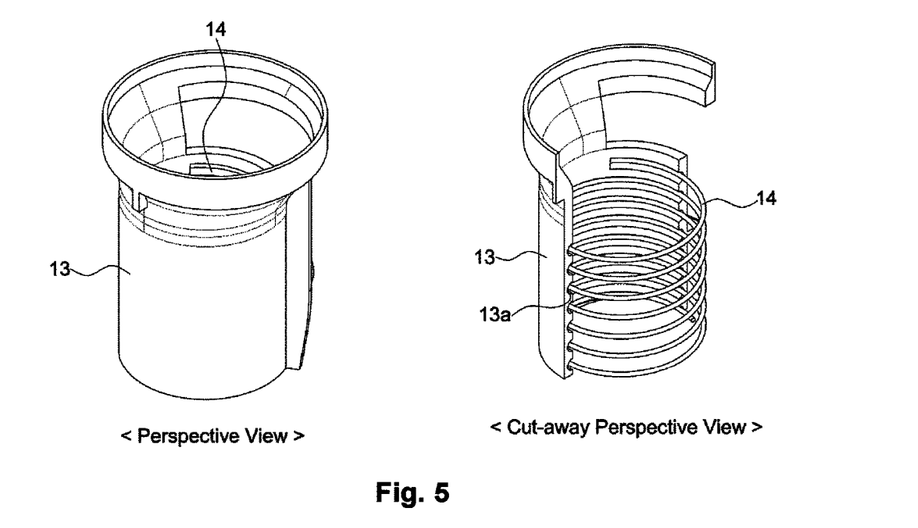
FIG. 5 is a view illustrating a retainer of the fuel-urea injection apparatus according to various embodiments of the present invention.

FIG. 5 is a view illustrating a retainer of the fuel-urea injection apparatus according to various embodiments of the present invention.

Figure 6:
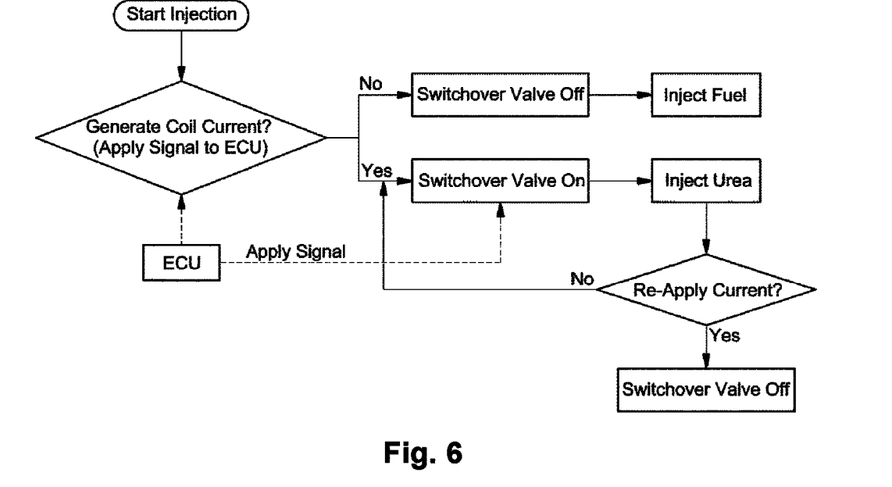
FIG. 6 is a flowchart illustrating a control process of the fuel-urea injection apparatus according to various embodiments of the present invention.
Figure 7:
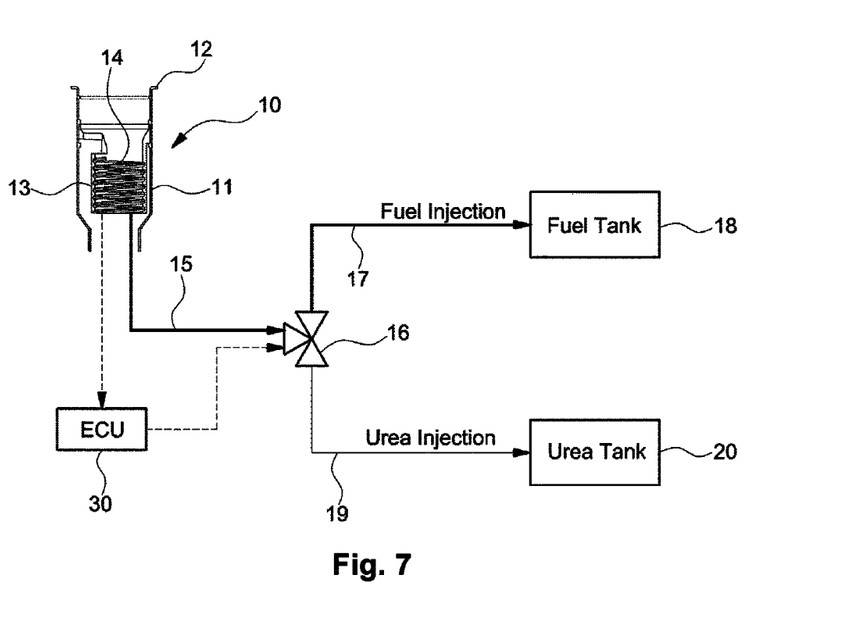
FIG. 7 and FIG. 8 are views illustrating operation states of the fuel-urea injection apparatus according to various embodiments of the present invention.
Figure 8:
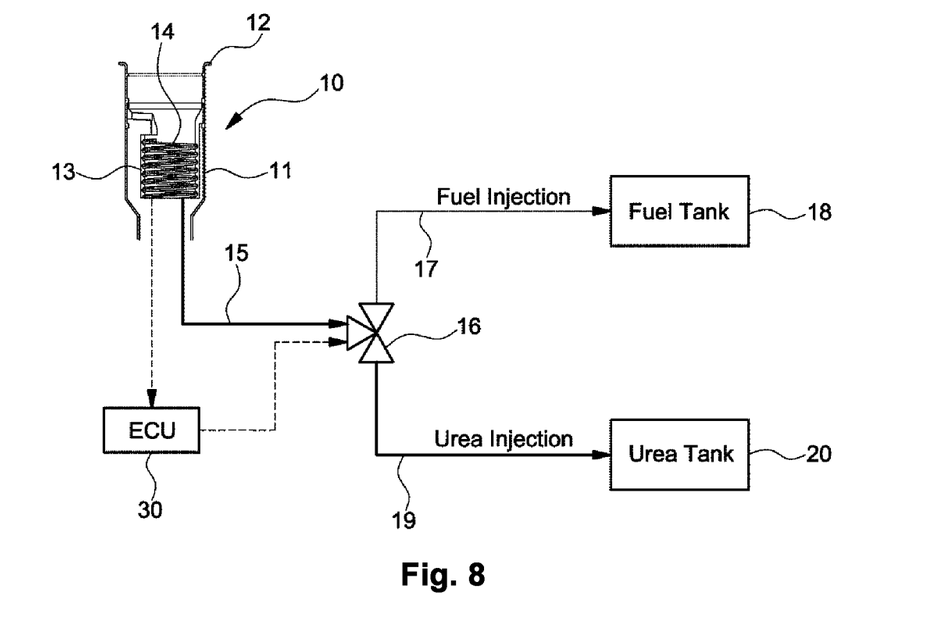

FIG. 6 is a flowchart illustrating a control process of the fuel-urea injection apparatus according to various embodiments of the present invention. FIGS. 7 and 8 are views illustrating operation states of the fuel-urea injection apparatus according to various embodiments of the present invention.

As illustrated in FIG. 3, a common inlet 12 used for injecting diesel fuel and urea is provided at a vehicle, that is, a diesel vehicle including an SCR system.

Namely, a fuel inlet and a urea inlet are integrated to form the common inlet 12. Both diesel fuel and urea are injected by the common inlet 12.

Filler necks of the vehicle are integrated to form a common filler neck 10 for injecting fuel and urea. The filler neck 10 includes only one common inlet 12 capable of being used for injecting both fuel and urea.

Meanwhile, fuel and urea are separately injected using corresponding injection nozzles. A fuel injection nozzle for injecting fuel and a urea injection nozzle 6 for injecting urea should be separately used.

According to various embodiments of the present invention, the fuel injection nozzle is a general diesel fuel injection nozzle used to refuel a vehicle with fuel, namely, diesel fuel, to supply fuel to a fuel tank 18 (see FIG. 4) through the common inlet 12.

Furthermore, the urea injection nozzle 6 is used to fill a urea tank 20 (see FIG. 4) with urea for decreasing nitrogen oxide (NOx), as described above, through the common inlet 12.

The filler neck 10, into which the fuel injection nozzle and the urea injection nozzle 6 are inserted, is provided in an integrated manner. However, injection pipes 17 and 19 for injection of fuel and urea are connected between a three-way directional switchover valve 16 and each tank (fuel tank 18 and urea tank 20), respectively.

Referring to FIG. 3, a filler housing 11 mounted at a vehicle body B is illustrated. The common inlet 12, into which the fuel injection nozzle and the urea injection nozzle 6 are inserted, is formed at the filler housing 11.

Furthermore, a retainer 13 for improving injection characteristics and preventing mixture of diesel/urea is mounted in the filler housing 11. The retainer 13 guides the fuel injection nozzle and the urea injection nozzle 6 which are inserted through the common inlet 12, so that the fuel injection nozzle and the urea injection nozzle 6 may be inserted to the corresponding injection positions.

The retainer 13 is manufactured to have a cylinder shape and is mounted in the filler housing 11. The fuel injection nozzle and the urea injection nozzle 6, which are inserted through the common inlet 12, pass through an inside of the retainer 13.

In various embodiments of the present invention, a detector for detecting whether the injection nozzle inserted through the common inlet 12 is the fuel injection nozzle or the urea injection nozzle 6, and outputting a signal, is provided.

In various embodiments of the present invention, the detector may include a coil 14 mounted at the filler neck 10. The coil 14 generates current at an inner surface of a path, where an injection nozzle is inserted and passes, of the filler neck 10.

In various embodiments, the coil 14 is mounted at an inner diameter surface of the retainer 13 which is mounted in the filler housing 11 of the filler neck 10.

In this case, a spiral coil groove 13a, into which the coil 14 is inserted, is formed at the inner diameter surface of the retainer 13. The coil 14 is inserted into the coil groove 13a and is spirally disposed along the coil groove 13a in a winding manner.

Furthermore, the coil 14 and a controller (ECU) 30 are in contact with each other through a circuit so that the controller 30 receives current which is generated in the coil 14 and is output from the coil 14, as a detection signal detected in the detector.

In addition, a magnet 7 is mounted at one of the fuel injection nozzle and the urea injection nozzle 6. When the injection nozzle including the magnet 7 is inserted through the common inlet 12 to pass through the inside of the retainer 13, the coil 14 generates an induced current.

That is, when the magnet 7 of the injection nozzle is inserted into the coil 14 mounted at the filler neck 10, the coil 14 generates the induced current. When the induced current is applied to the controller 30 as a detection signal, the controller 30 may recognize insertion of the injection nozzle including the magnet 7.

The magnet 7 is mounted at predetermined one of the fuel injection nozzle and the urea injection nozzle 6. Current generated in the coil 14 by reaction between the magnet 7 and the coil 14 is applied to the controller 30 as a signal to recognize an injection nozzle so that the controller 30 determines that the magnet 7 is mounted to the injection nozzle inserted through the common inlet 12.

Generally, a urea injection nozzle for injecting urea and a urea inlet of a filler neck are including a north (N) pole and a south (S) pole of a magnet, respectively. In this case, when the urea injection nozzle is inserted into the urea inlet, insertion of the urea injection nozzle into the urea inlet is recognized by magnet force generated from both north and south poles of the magnet, and then injection of urea is started.

Accordingly, in the fuel-urea injection apparatus according to various embodiments of the present invention, the fuel injection nozzle may be a general diesel injection nozzle which does not include the magnet 7 and the urea injection nozzle 6 may be an injection nozzle including the magnet 7. In this case, the magnet 7 of the urea injection nozzle 6 may be used to generate the induced current at the coil 14 of the filler neck 4.

Hereinafter, the magnet 7 mounted at the urea injection nozzle 6 will be explained according to various embodiments. In this case, when the urea injection nozzle 6 is inserted into the common inlet 12 of the filler neck 10, the coil 14 mounted at the retainer 13 generates the induced current, and then the controller 30 receives the induced current.

Furthermore, the magnet 7 of the urea injection nozzle 6 includes an N pole and an S pole disposed in a longitudinal direction of the urea injection nozzle 6, namely, in an insertion direction of the urea injection nozzle 6.

As is known, relative movement between a coil and a magnet including an N pole and an S pole induces a current in the coil. This is referred to as electromagnet induction. In this case, current generated in the coil is referred to as induced current.

In this case, current (and induced electromotive force) amount is variable based on a movement speed of the magnet passing through the coil, strength of the magnet, and number of turns of the coil. Induced electromotive force V is expressed by Equation 1 below, $$V = -n \times \Delta\Phi/\Delta t,$$ [Equation 1]

where, n represents number of turns of the coil, $\Delta\Phi$ represents t change in magnet flux during time $\Delta t$, and "−" represents that electromotive force flows against direction of the change in the magnet flux.

Meanwhile, FIG. 4 is a schematic view illustrating the entire configuration of the fuel-urea injection apparatus according to various embodiments. The retainer 13 is mounted in the filler housing 11 of the filler neck 10 and the coil 14 is mounted in the retainer 13.

Furthermore, an injection pipe 15 is connected to the filler housing 11. The three-way directional switchover valve 16 is mounted at the injection pipe 15. The switchover valve 16 is connected to the fuel tank 18 through the fuel injection pipe 17 and is connected to the urea tank 20 through the urea injection pipe 19.

The switchover valve 16 is an electric type valve which switches opening and closing of an inner flow path in accordance with a control signal of the controller 30. A general three-way valve for controlling and switching a flow direction of fluid is used as the switchover valve 16.

The switchover valve 16 may selectively open an inner path connected to the fuel injection pipe 17, and an outlet (fuel outlet), whereas the switchover valve 16 may selectively open an inner path connected to the urea injection pipe 19, and an outlet (urea outlet), in accordance with the control signal of the controller 30.

An inlet side of the switchover valve 16 is connected to the common injection pipe 15 connected to the filler housing 11 of the filler neck 10. A fuel outlet side of the switchover valve 16 is connected to the fuel injection pipe 17. A urea outlet side of the switchover valve 16 is connected to the urea injection pipe 19.

In this configuration, when the urea injection nozzle 6 is inserted into the coil 14 mounted at the filler neck 10 including the common inlet 12, the induced current is generated by an electromagnet induction law (namely, Faraday's law). The controller 30 receiving the induced current determines insertion of the urea injection nozzle 6.

Namely, the controller 30 determines the urea injection nozzle or the fuel injection nozzle in accordance with whether the induced current is transferred or not. Additionally, the controller 30 determines whether injected fluid is fuel or urea.

Furthermore, the controller 30 controls an operation of the switchover valve 16 based on detection result. When the controller 30 determines insertion of the fuel injection nozzle, the controller 30 controls an operation of the switchover valve 16 (switchover valve off) to open the fuel outlet side connected to the fuel injection pipe 17 and to close the urea outlet side connected to the urea injection pipe 19 (see FIG. 6).

In this case, as illustrated in FIGS. 6 and 7, when fuel is refueled through the fuel injection nozzle, the fuel tank 18 may be filled with fuel through the common injection pipe 15, the switchover valve 16, and the fuel injection pipe 17.

On the other hand, when the controller 30 determines insertion of the urea injection nozzle 6, the controller 30 controls an operation of the switchover valve 16 (switchover valve on) to open the urea outlet side connected to the urea injection pipe 19 and to close the fuel outlet side connected to the fuel injection pipe 17 (see FIG. 6).

In this case, as illustrated in FIGS. 6 and 8, when urea is refueled through the urea injection nozzle 6, the urea tank 20 may be filled with urea through the common injection pipe 15, the switchover valve 16, and the urea injection pipe 19.

Generally, in accordance with a high frequency of fuel injection and a low frequency of urea injection, as illustrated in FIG. 6, the switchover valve 16 usually opens the fuel outlet side (switchover valve off). When the controller 30 recognizes generation of the induced current in the coil 14, the controller 30 controls the operation of the switchover valve 16 to open the urea outlet side (switchover valve on).

As apparent from the above description, in accordance with various embodiments of the present invention, the fuel-urea injection apparatus including the common inlet for the vehicle is provided. As the fuel and urea inlets, which were separately mounted at the diesel vehicle including the SCR system, are integrated, the common inlet and the common filler neck are used. As a result, detracting from aesthetics of the vehicle due to expansion of the fuel filler door and decrease of marketability may be prevented.

Furthermore, mis-fuelling of urea to the fuel inlet may be prevented. Integration and sharing of components of the vehicle, such as the filler neck, which was divided into a filler neck for fuel injection and a filler neck for urea injection may be feasible. As a result, quantity of the components may be decreased.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fuel-urea injection apparatus including a common inlet for a vehicle, comprising:
   a filler neck comprising the common inlet, into which a fuel injection nozzle or a urea injection nozzle, is inserted;
   a detector configured for detecting whether the injection nozzle inserted into the filler neck is the fuel injection nozzle or the urea injection nozzle, wherein the detector comprises: a magnet mounted at one of the fuel and urea injection nozzles; and a coil mounted along a circumference of the filler neck at a path, through which the injection nozzle inserted through the common inlet passes, in the filler neck, the coil generating an induced current through the magnet when the injection nozzle including the magnet passes through the path;
   a switchover valve mounted at a common injection pipe connected to the filler neck;
   a urea injection pipe connected between a urea outlet of the switchover valve and a urea tank;
   a fuel injection pipe connected between a fuel outlet of the switchover valve and a fuel tank; and
   a controller configured for controlling an operation of the switchover valve to either the fuel outlet or the urea outlet in accordance with the injection nozzle detected by the detector as being inserted into the filler neck to supply either fuel or urea injected through the common injection pipe to the corresponding outlet of the fuel and urea outlets, wherein the controller is configured to control the operation of the switchover valve to open either the fuel outlet or the urea outlet when the induced current of the coil is applied to the controller.

2. The fuel-urea injection apparatus according to claim 1 wherein the magnet is mounted at the urea injection nozzle.

3. The fuel-urea injection apparatus according to claim 1, wherein the coil is mounted at a cylindrically shaped retainer of the filler neck for guiding the injection nozzle inserted into the filler neck through the common inlet, and the cylindrically shaped retainer is mounted in a filler housing of the filler neck.

4. The fuel-urea injection apparatus according to claim 3, wherein the coil is wound along a spiral-shaped inner diameter surface of the cylindrically shaped retainer.

5. The fuel-urea injection apparatus according to claim 4, wherein the coil is inserted into a spiral-shaped coil groove formed at the inner diameter surface of the cylindrically shaped retainer, and the coil is mounted along the spiral-shaped coil groove.

* * * * *